United States Patent
Maryanski et al.

(10) Patent No.: US 11,450,912 B2
(45) Date of Patent: Sep. 20, 2022

(54) STRUCTURAL MEMBER FOR A VEHICLE BATTERY TRAY

(71) Applicant: Dura Operating, LLC, Auburn Hills, MI (US)

(72) Inventors: Nolan Robert Maryanski, Rochester, MI (US); Amer Mansour, West Bloomfield, MI (US); Walt Steiner, Rochester, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 781 days.

(21) Appl. No.: 16/220,569

(22) Filed: Dec. 14, 2018

(65) Prior Publication Data

US 2020/0194755 A1 Jun. 18, 2020

(51) Int. Cl.
*H01M 50/20* (2021.01)
*B60L 50/60* (2019.01)
*B60L 50/64* (2019.01)

(52) U.S. Cl.
CPC ............. *H01M 50/20* (2021.01); *B60L 50/64* (2019.02); *B60L 50/66* (2019.02)

(58) Field of Classification Search
CPC .......... H01M 50/20; B60L 50/64; B60L 50/66
See application file for complete search history.

(56) References Cited

U.S. PATENT DOCUMENTS

| | | | | | |
|---|---|---|---|---|---|
| 4,535,863 | A | * | 8/1985 | Becker | H01M 50/20 180/68.5 |
| 6,040,080 | A | * | 3/2000 | Minami | B60K 1/04 429/96 |
| 6,153,331 | A | * | 11/2000 | Brantley | H01M 50/20 16/DIG. 15 |
| 2005/0034431 | A1 | * | 2/2005 | Dey | B29C 65/08 53/478 |
| 2008/0160394 | A1 | * | 7/2008 | Takasaki | B60L 3/0007 429/96 |
| 2015/0084370 | A1 | * | 3/2015 | Newberry | B62D 35/007 296/180.1 |
| 2018/0050607 | A1 | * | 2/2018 | Matecki | H01M 50/20 |

* cited by examiner

*Primary Examiner* — Alexander Usyatinsky
(74) *Attorney, Agent, or Firm* — Vivacqua Crane PLLC (57) ABSTRACT

A structural member for a vehicle battery tray includes a base that forms a bottom of the vehicle battery tray, a stanchion extending from the base into the vehicle battery tray, and a rivet nut disposed in the base and extending into the stanchion, wherein the rivet nut is sealed to the base.

20 Claims, 7 Drawing Sheets

STRUCTURAL MEMBER FOR A VEHICLE BATTERY TRAY

FIELD

The present disclosure relates generally to a structural member in a vehicle battery tray, and more particularly to a structural member in a vehicle battery tray having a sealed rivet nut for mounting the vehicle battery tray.

BACKGROUND

The statements in this section merely provide background information related to the present disclosure and may or may not constitute prior art.

Motor vehicles, including electric and hybrid vehicles providing at least partial propulsion from battery power, create unique conditions that must be considered due to the energy and fluid in the battery cells. For example, vehicle battery trays, which house the battery cells, are preferably sealed to prevent moisture and debris from damaging the battery cells. At the same time, the vehicle battery trays are designed to absorb structural impact in order to minimize battery cell damage. Thus, vehicle battery trays include features, such as welds and bolts, that provide structural strength but that also increase the permeability of the battery tray to moisture and debris.

Thus, while current vehicle battery tray designs achieve their intended purpose, there is a need for improved components in vehicle battery tray designs that reduce weight, maintain strength, minimize cost, all the while providing sealing to prevent the entry of moisture and debris.

SUMMARY

According to several aspects, a structural member for a vehicle battery tray is provided. The structural member includes a base that forms a bottom of the vehicle battery tray, a stanchion extending from the base into the vehicle battery tray, and a rivet nut disposed in the base and extending into the stanchion, wherein the rivet nut is sealed to the base.

In one aspect, the stanchion defines a hollow center area and the rivet nut is disposed within the hollow center area.

In another aspect, the stanchion includes a rib extending through the hollow center area.

In another aspect, the rib defines an opening and the rivet nut is disposed within the opening.

In another aspect, the base defines a rivet hole and the rivet nut is disposed within the rivet hole.

In another aspect, the stanchion is aligned with the rivet hole.

In another aspect, the base includes a counterbore disposed around the rivet hole.

In another aspect, the rivet nut includes a head disposed within the counterbore such that a distal end of head of the rivet nut is flush with or inset from a bottom surface of the base.

In another aspect, the rivet nut includes a head and the head is sealed to the base by a sealant.

In another aspect, the stanchion includes a web and a flange connected to the web, wherein the flange is parallel to the base.

In another aspect, the flange includes a groove formed in an upper surface of the flange.

In another aspect, a support bracket is disposed within the groove.

According to several other aspects, a structural member for a vehicle battery tray includes a base having a first surface and a second surface opposite the first surface, the first surface forming a bottom of the vehicle battery tray, a stanchion extending from the second surface of the base, the stanchion having a first wall and a second wall that define a hollow center area within the stanchion, a rivet hole formed in the first surface of the base and extending into the hollow center area of the stanchion, and a rivet nut disposed within the rivet hole, wherein the rivet nut is sealed to the first surface of the base.

In one aspect, the stanchion includes a rib extending through the hollow center area, the rib connected to the first wall and to the second wall.

In another aspect, the rib defines an opening and the rivet nut is disposed within the opening.

In another aspect, the first wall and the second wall are each perpendicular to the base and the rib is parallel to the base.

In another aspect, the first surface of the base includes a counterbore disposed around the rivet hole.

In another aspect, the rivet nut includes a head disposed within the counterbore such that a distal end of the head of the rivet nut is flush with or inset from a bottom surface of the base.

In another aspect, the rivet nut includes a head sealed to the base by a sealant.

In another aspect, the stanchion includes a web and a flange, the web connected to the first wall and the second wall, the flange connected to the web, wherein the flange is parallel to the base and includes a groove formed in an upper surface of the flange.

In another aspect, a support bracket is disposed within the groove.

According to several other aspect, a vehicle battery tray includes a plurality of plates, a structural member disposed between the plurality of plates, the structural member having: a first end; a second end disposed longitudinally opposite the first end; a base connected to each of the plurality of plates to form a bottom of the vehicle battery tray; a stanchion extending from the base into the vehicle battery tray; and a rivet nut disposed in the base and extending into the stanchion, wherein the rivet nut is sealed to the base. A first side wall is connected to the plurality of plates and the first end of the structural member. A second side wall is connected to the plurality of plates and the second end of the structural member and disposed opposite the first side wall. The first end and the second end are not sealed to the first side wall and the second side wall.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
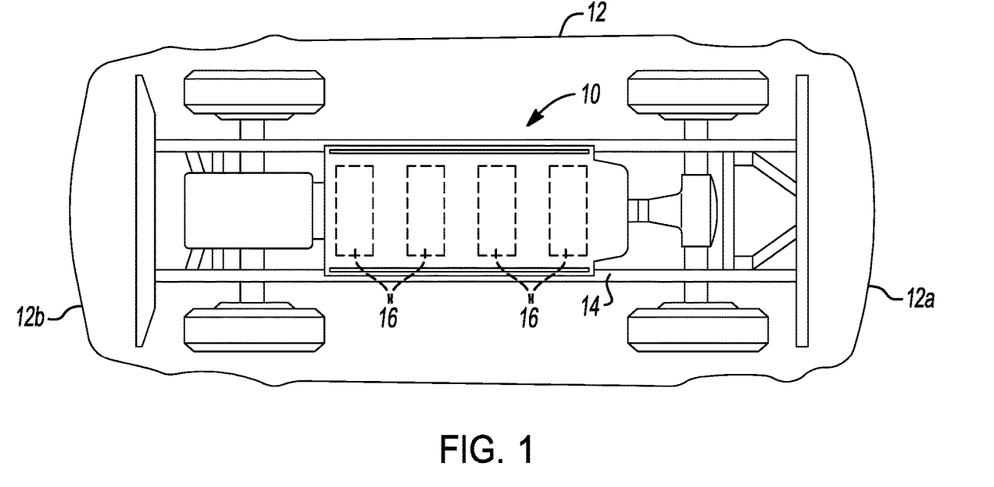
FIG. 1 is a bottom plan view of battery powered vehicle having a battery tray assembly according to an exemplary embodiment.

Referring to FIG. 1, a battery tray assembly having a structural member according to the principles of the present disclosure is generally indicated by reference number 10. The battery tray assembly 10 is shown with an exemplary battery powered vehicle 12. While the battery powered vehicle 12 is illustrated as a passenger car, it should be appreciated that the battery powered vehicle 12 may be a truck, SUV, bus, or any other type of vehicle. The battery tray assembly 10 is mounted to a frame 14 of the battery powered vehicle 12. The battery tray assembly 10 is configured to house at least one and according to several aspects multiple individual battery cells 16 which provide an electrical charge as the sole power to propel the battery powered vehicle 12, or may provide supplemental power in addition to an engine (not shown).

Figure 2:
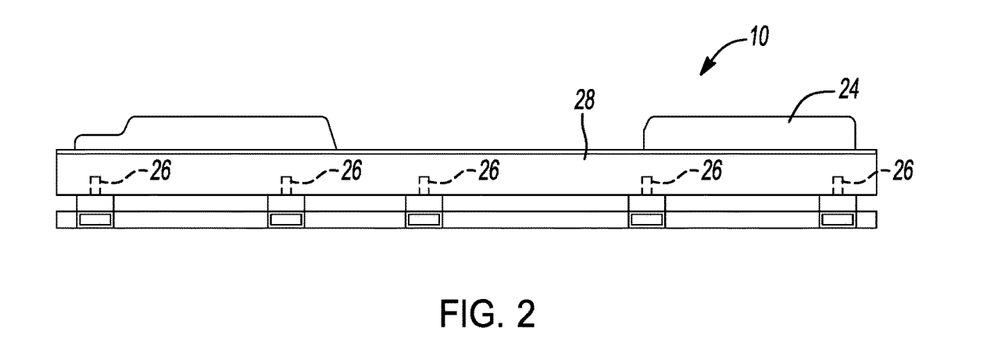
FIG. 2 is a side view of the battery tray assembly of FIG. 1.
Figure 3:
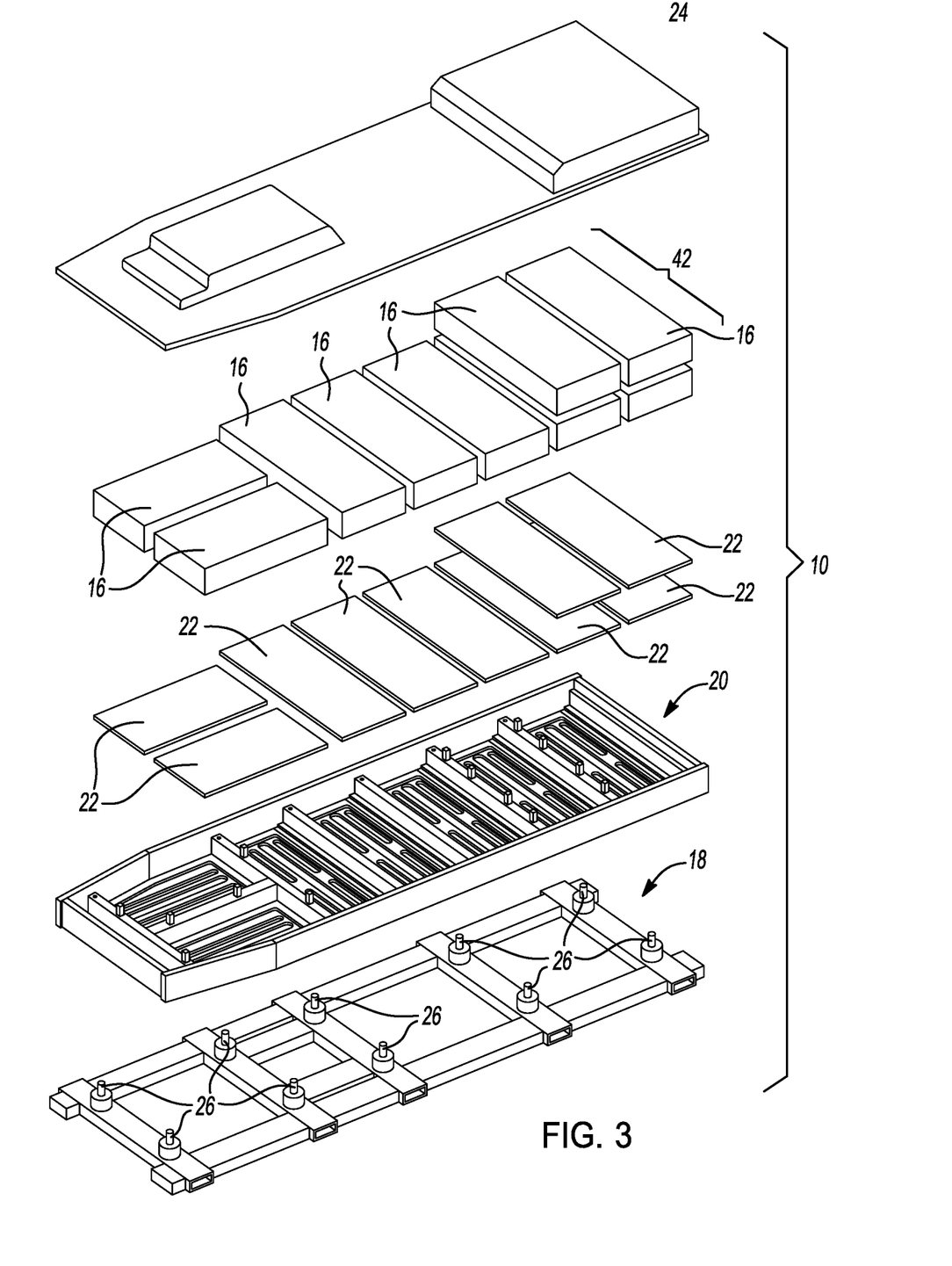
FIG. 3 is a top perspective exploded view of the battery tray assembly of FIG. 2.

Referring to FIGS. 2 and 3, the battery tray assembly 10 generally includes an H-frame 18, a vehicle battery tray 20, panels 22, and a cover 24. The H-frame 18 is connected to the frame 14 of the battery powered vehicle 12 and supports the vehicle battery tray 20 and battery cells 16. The H-frame 18 includes bolts 26 or other fasteners used to connect the vehicle battery tray 20 to the H-frame 18, as will be described in greater detail below.

The panels 22 are disposed within the vehicle battery tray 20. In general, one panel 22 is associated with a respective one battery cell 16. The battery cells 16 are thus disposed within the vehicle battery tray 20 on top of the panels 22. The panels 22 provide vibration dampening to the battery cells 16. The cover 24 is disposed overtop the vehicle battery tray 20 to enclose the battery cells 16 within the vehicle battery tray 20. In one aspect, the cover 24 is sealed to the vehicle battery tray 20 to prevent moisture and debris from entering the vehicle battery tray 20.

Figure 4:
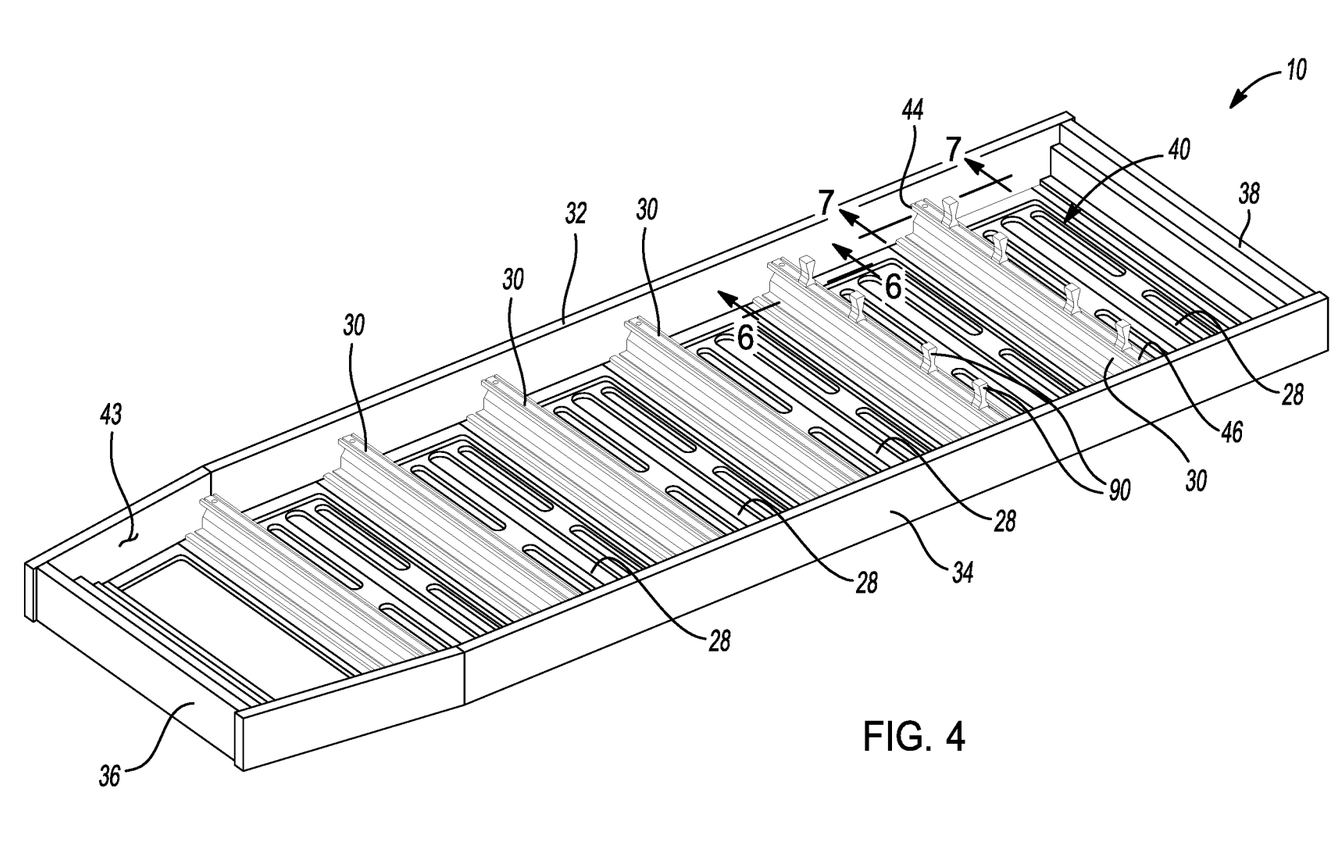
FIG. 4 is a top perspective view of a battery tray shown in FIG. 3.
Figure 5:
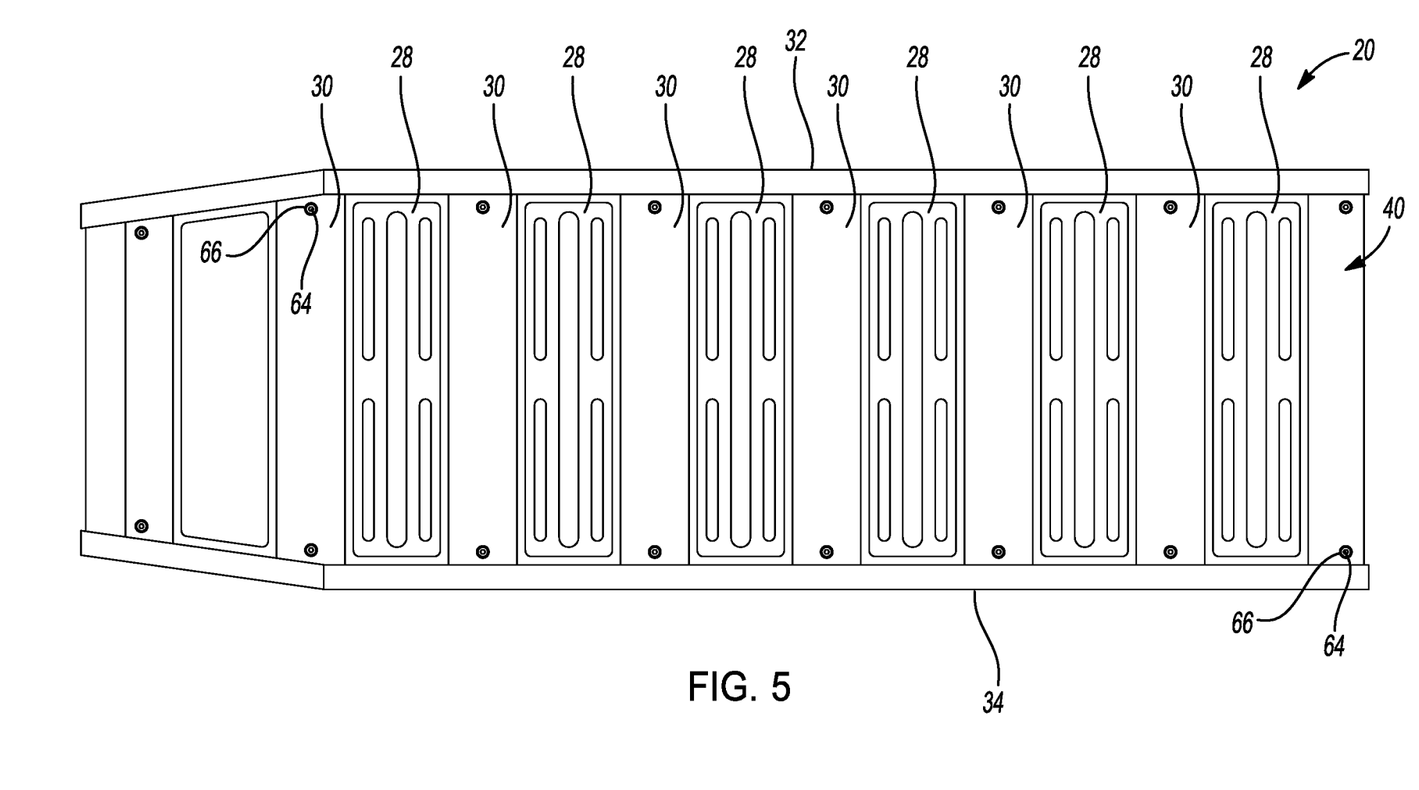
FIG. 5 is a bottom view of the battery tray of FIG. 4.

With reference to FIGS. 4 and 5, the vehicle battery tray 20 generally includes plates 28, structural members 30, a first side wall 32, a second side wall 34, a front wall 36, and a rear wall 38. The plates 28 and the structural members 30 alternate and are connected together to define a base 40 of the vehicle battery tray 20. Thus, plates 28 are disposed between each of the structural members 30. The first side wall 32, the second side wall 34, the front wall 36, and the rear wall 38 are each connected to the base 40 and cooperate to define a tub 43 that receives the battery cells 16 (FIGS. 1 and 3). The front wall 36 is disposed opposite the rear wall 38 while the first side wall 32 is disposed opposite the second side wall 34. As shown in FIG. 1, the front wall 36 is oriented towards a front 12b of the battery powered vehicle 12 while the rear wall 38 is oriented towards a rear 12a of the battery powered vehicle 12. The first side wall 32 connects the front wall 36 and the rear wall 38 and the second side wall 34 connects the front wall 36 and the rear wall 38. The front wall 36, the rear wall 38, the first side wall 32, and the second side wall 34 are each substantially perpendicular to the base 40. As used herein, the term "substantially" is known by those skilled in the art. Alternatively, the term "substantially" means +/−10 degrees. Thus, the vehicle battery tray 20 is configured to hold and surround the battery cells 16, providing protection especially from the sides, front, rear, and bottom.

The plates 28 and the structural members 30 extend laterally across the vehicle battery tray 20. The number of alternating plates 28 and structural members 30 may be varied to vary a length of the vehicle battery tray 20 and to accommodate different numbers of battery cells 16. The structural members 30 provide rigidity to the vehicle battery tray 20, create compartments for individual battery cells 16, and provide support for an upper deck 42 (FIG. 3) of battery cells 16. The structural members 30 each include a first end 44 and a second end 46 disposed longitudinally opposite the first end 44. The first ends 44 of the structural members 30 are connected to the first side wall 32. The second ends 46 of the structural members 30 are connected to the second side wall 34. For example, the first ends 44 are spot welded to the first side wall 32 and the second ends 46 are spot welded to the second side wall 34. Thus, the first ends 44 and the second ends 46 are not sealed to the first side wall 32 and the second side wall 34, respectively. Sealing of the vehicle battery tray 20 is achieved through the design of the structural members 30, as will be described below.

Figure 6:
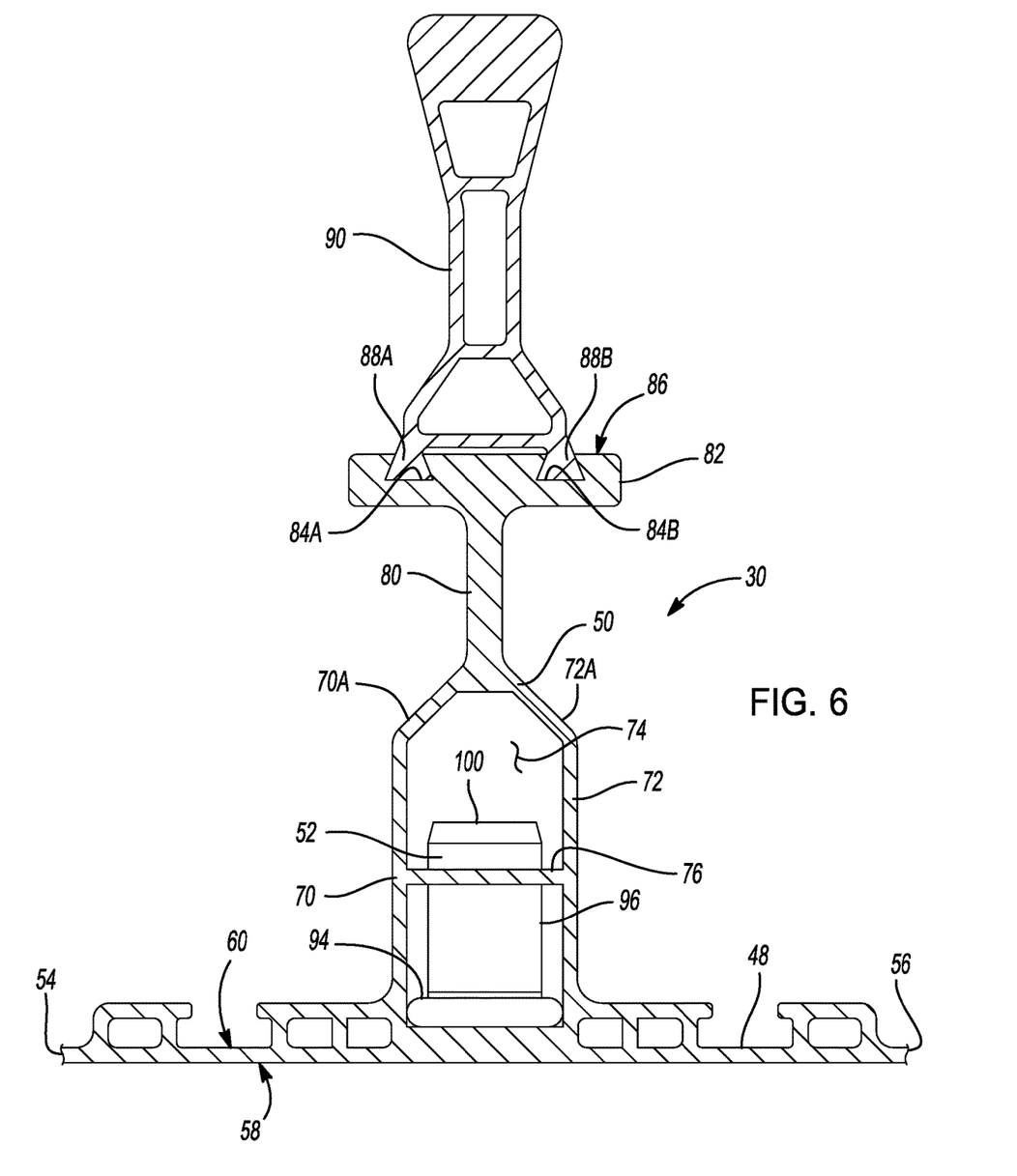
FIG. 6 is a cross-section view of a structural member viewed in the direction of arrows 6-6 in FIG. 4.
Figure 7:
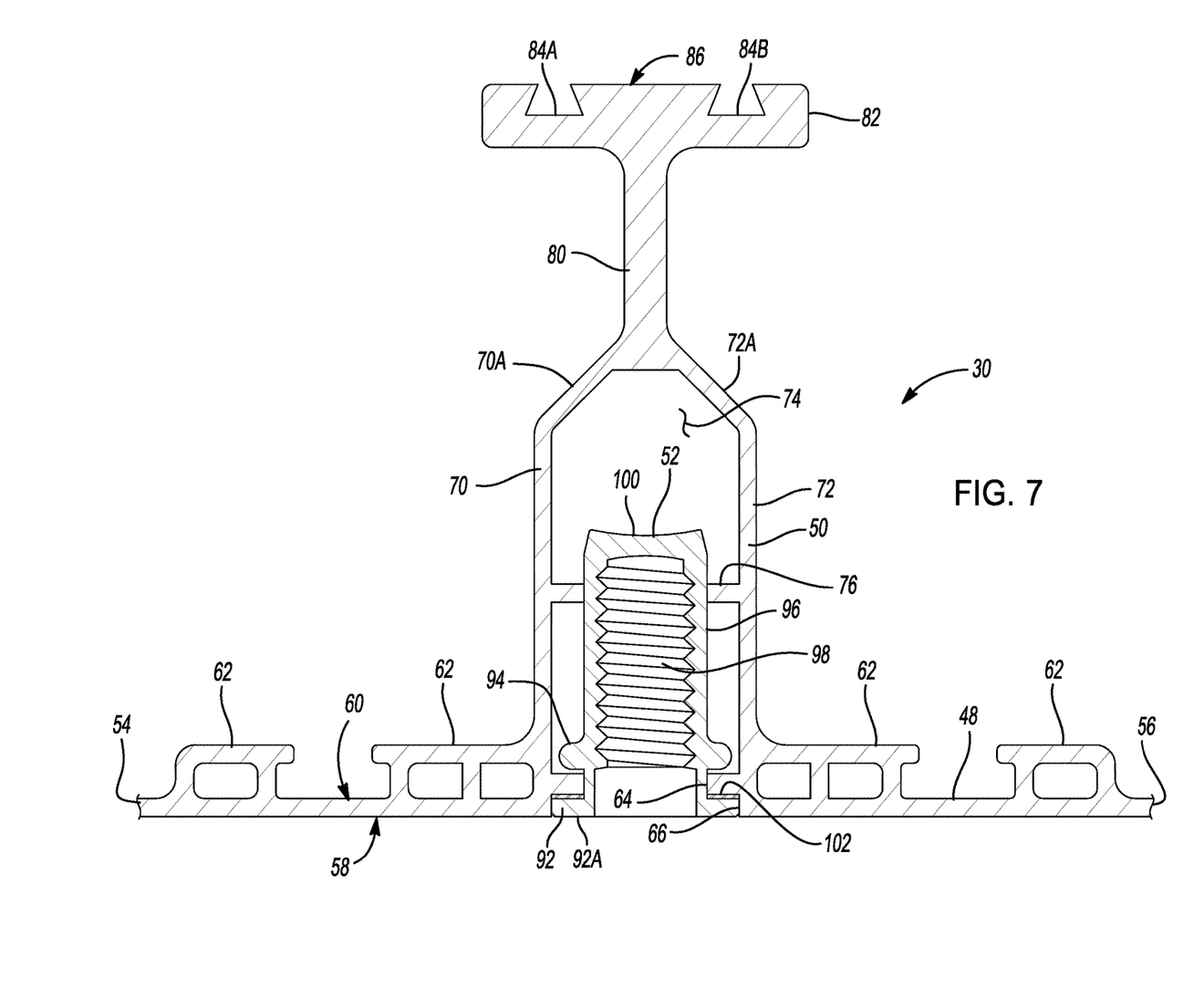
FIG. 7 is a cross-section view of a structural member viewed in the direction of arrows 7-7 in FIG. 4.

With reference to FIGS. 6 and 7, a cross-section of the structural members 30 is illustrated. Each of the structural members 30 are substantially identical and thus only one structural member 30 will be described herein. The structural member 30 generally includes a base 48, a stanchion 50, and a rivet nut 52. The structural member 30 is preferably formed by extrusion.

The base 48 is generally planar and includes a first edge 54, a second edge 56 opposite the first edge 54, a first surface 58, and a second surface 60 opposite the first surface 58. Each of the first edge 54 and the second edge 56 are each connected to adjacent plates 28. The first surface 58 is disposed externally relative to the vehicle battery tray 20 and thus forms a portion of a bottom of the vehicle battery tray 20. The second surface 60 is disposed internally within the vehicle battery tray 20. The base 48 includes reinforced portions 62 that provide support during friction stir welding of the structural member 30 with adjacent plates 28.

Figure 8:
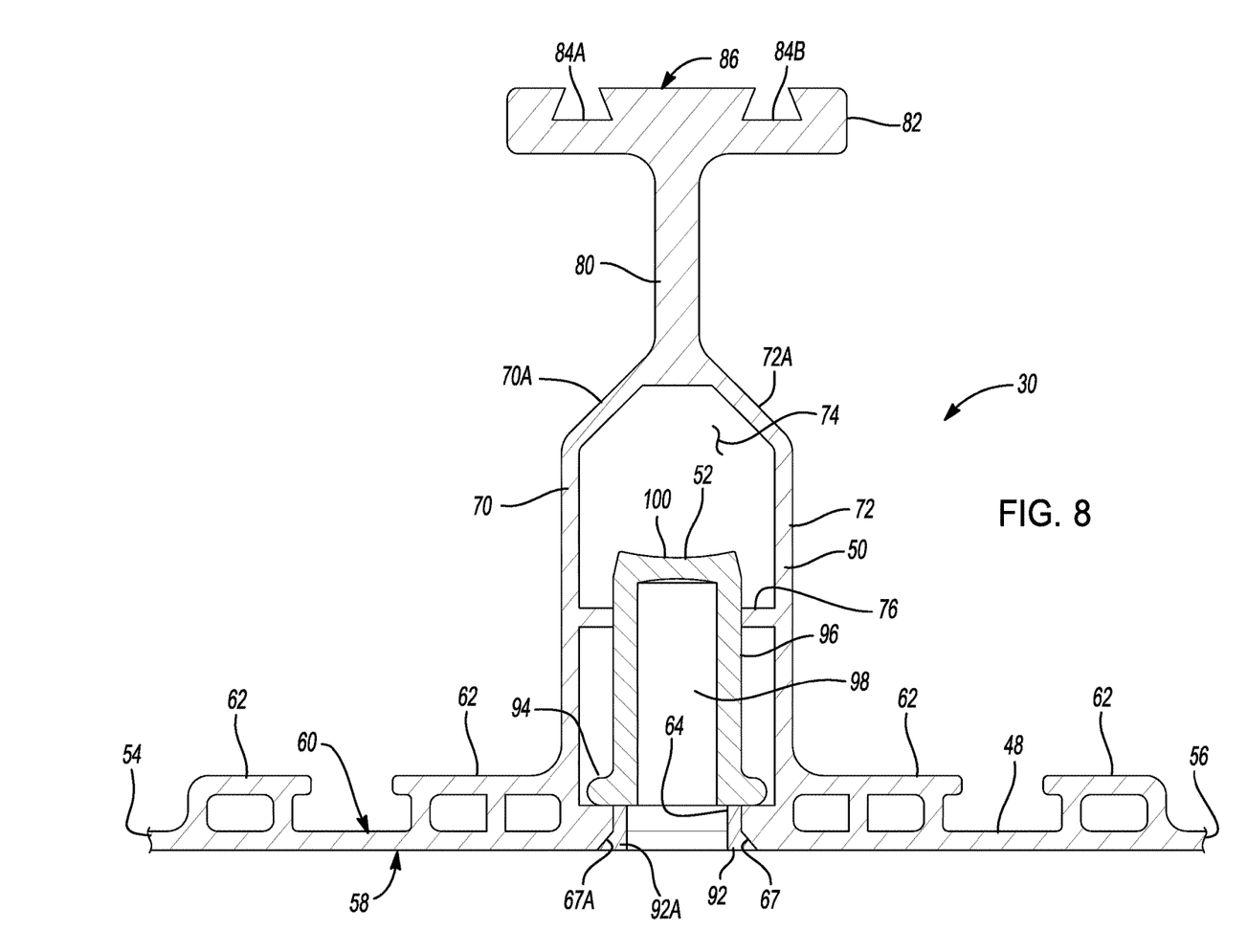
FIG. 8 is a cross-section view of the structural member of FIG. 7 showing an alternative embodiment having a countersink.

To support the rivet nut 52 as will be described in greater detail below, the base 48 further includes a rivet hole 64 (FIG. 7) formed in the first surface 58. The rivet hole 64 extends through the base 48. In the example provided, each structural member 30 includes two rivet holes 64 (FIG. 5). A counterbore 66 surrounds each rivet hole 64. The counterbore 66 includes a vertical side wall 66A. In an alternate embodiment, shown in FIG. 8, the counterbore 66 is replaced with a countersink 67. The countersink 67 includes an angled side wall 67A. The countersink 67 may accommodate a rivet nut 52 having an angled head or in conditions with tighter packaging requirements.

The stanchion 50 extends from the second surface 60 of the base 48 inwardly into the vehicle battery tray 20. The stanchion 50 extends longitudinally from the first end 44 to the second end 46 of the structural member 30, as seen in FIG. 4. The stanchion 50 is generally centered on the base 48 and is aligned with the rivet hole 64. The stanchion 50 includes a first wall 70 and a second wall 72 opposite the first wall 70. The first wall 70 and the second wall 72 extend substantially perpendicular to the base 48. The term "substantially" as used herein is known by those skilled in the art. Alternatively, the term "substantially" as used herein includes +/−10 degrees from perpendicular.

The first wall 70 and the second wall 72 cooperate to define a hollow center area 74 within the stanchion 50. The rivet hole 64 extends from the first surface 58 through to the hollow center area 74. A rib 76 is disposed within the hollow center area 74. The rib 76 extends from the first wall 70 to the second wall 72 and provides rigidity to the stanchion 50. The rib 76 is substantially parallel to the base 48. The term "substantially" as used herein is known by those skilled in the art. Alternatively, the term "substantially" as used herein includes +/−10 degrees from parallel. The rib 76 defines an opening 78 (FIG. 7) that receives and supports the rivet nut 52. Thus, the rib 76 includes two openings 78 (only one of which is shown) each aligned with one of the rivet holes 64.

The first wall 70 and the second wall 72 each have angled portions 70A and 72A, respectively, that meet at a web 80. The web 80 extends inwardly relative to the vehicle battery tray 20. A flange 82 is disposed at and end of the web 80. The flange 82 is substantially parallel to the base 48. The flange 82 includes a pair of grooves 84A and 84B formed in a upper surface 86 of the flange 82. The grooves 84A, 84B are sized to receive feet 88A, 88B, respectively, of a support bracket 90 (FIG. 6). The support bracket 90 is welded to the flange 82. The support bracket 90 supports the upper deck 42 (FIG. 3) of battery cells 16. Any number of support brackets 90 may be slid within the grooves 84A, 84B and welded to the flange 82 to provide support to the upper deck 42 of battery cells 16.

As noted above, the rivet nut 52 is disposed within the rivet hole 64 and the opening 78. The rivet nut 52 provides an attachment point for the bolts 26 of the H-frame 18 (FIGS. 2 and 3). A head 92 (FIG. 7) of the rivet nut 52 is disposed within the counterbore 66. Where the structural member 30 includes the countersink 67 (FIG. 8), the head 92 is disposed within the countersink 67. A distal end 92A of the head 92 of the rivet nut 52 is flush with or inset from the first surface 58, i.e., the bottom of the vehicle battery tray 20. The rivet nut 52 is rivetted into the base 48 to secure the rivet nut 52 to the base 48. Thus, a deformed portion 94 formed during the riveting process is disposed within the hollow center area 74 of the stanchion 50. A body 96 of the rivet nut 52 extends into the hollow center area 74 through the opening 78 of the rib 76. As noted above, the rib 76 provides support to the rivet nut 52. The rivet nut 52 includes a threaded portion 98 (FIG. 7) within the body 96 and a closed end 100. A sealant 102 (FIG. 7) is disposed on the head 92 of the rivet nut 52. The sealant 102 seals the rivet nut 52 to the first surface 58 of the structural member 30. The sealant 102 may be a coating on the head 92 of the rivet nut 52 or a separate ring seal.

The vehicle battery tray 20, and specifically the structural member 30 of the present disclosure offers several advantages. Sealing around the rivet nut 52 allows the vehicle battery tray 20 to be mounted to the H-frame 18 while protecting the battery cells 16 from moisture and debris. Thus, the ends 44 and 46 of the structural members 30 are not required to be sealed to the first side wall 32 and second side wall 34. Extrusion of the structural member 30 allows for reduced weight and processing costs while maintaining strength.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle battery tray comprising:
a base that forms a bottom of the vehicle battery tray;
a stanchion extending from the base into the vehicle battery tray; and
a rivet nut disposed in the base and extending into the stanchion, wherein the rivet nut is sealed to the base, wherein the base includes a first surface and a second surface opposite the first surface, the first surface forming the bottom of the vehicle battery tray and the stanchion extending from the second surface of the base, the stanchion having a first wall and a second wall that define a hollow center area within the stanchion, and further comprising a rivet hole formed in the first surface of the base and extending into the hollow center area of the stanchion, wherein the rivet nut is disposed within the rivet hole.

2. The vehicle battery tray of claim 1 wherein the stanchion includes a rib extending through the hollow center area.

3. The vehicle battery tray of claim 2 wherein the rib defines an opening and the rivet nut is disposed within the opening.

4. The vehicle battery tray of claim 1 wherein the stanchion is aligned with the rivet hole.

5. The vehicle battery tray of claim 1 wherein the base includes a counterbore disposed around the rivet hole.

6. The vehicle battery tray of claim 5 wherein the rivet nut includes a head disposed within the counterbore such that a distal end of head of the rivet nut is flush with or inset from a bottom surface of the base.

7. The vehicle battery tray of claim 1 wherein the rivet nut includes a head and the head is sealed to the base by a sealant.

8. The vehicle battery tray of claim 1 wherein the stanchion includes a web and a flange connected to the web, wherein the flange is parallel to the base.

9. The vehicle battery tray of claim 8 wherein the flange includes a groove formed in an upper surface of the flange.

10. The vehicle battery tray of claim 9 further comprising a support bracket disposed within the groove.

11. A vehicle battery tray comprising:
a plurality of plates;
a structural member disposed between the plurality of plates, the structural member having:
a first end;
a second end disposed longitudinally opposite the first end;
a base connected to each of the plurality of plates to form a bottom of the vehicle battery tray;
a stanchion extending from the base into the vehicle battery tray; and
a rivet nut disposed in the base and extending into the stanchion, wherein the rivet nut is sealed to the base;
a first side wall connected to the plurality of plates and the first end of the structural member; and
a second side wall connected to the plurality of plates and the second end of the structural member and disposed opposite the first side wall; and
wherein the first end and the second end are not sealed to the first side wall and the second side wall.

12. The vehicle battery tray of claim 1, wherein the stanchion includes a rib extending through the hollow center area, the rib connected to the first wall and to the second wall.

13. The vehicle battery tray of claim 12, wherein the rib defines an opening and the rivet nut is disposed within the opening.

14. The vehicle battery tray of claim 12, wherein the first wall and the second wall are each perpendicular to the base and the rib is parallel to the base.

15. The vehicle battery tray of claim 1, wherein the first surface of the base includes a counterbore disposed around the rivet hole.

16. The vehicle battery tray of claim 15, wherein the rivet nut includes a head disposed within the counterbore such that a distal end of the head of the rivet nut is flush with or inset from a bottom surface of the base.

17. The vehicle battery tray of claim 16, wherein the rivet nut includes a head sealed to the base by a sealant.

18. The vehicle battery tray of claim 1, wherein the stanchion includes a web and a flange, the web connected to the first wall and the second wall, the flange connected to the web, wherein the flange is parallel to the base and includes a groove formed in an upper surface of the flange.

19. The vehicle battery tray of claim 18, further comprising a support bracket disposed within the groove.

20. The vehicle battery tray of claim 1, wherein the first surface of the base includes a countersink disposed around the rivet hole.

\* \* \* \* \*